(12) United States Patent
Morton et al.

(10) Patent No.: US 12,735,189 B2
(45) Date of Patent: Sep. 15, 2026

(54) SYMMETRIC OPEN PROPULSOR ROTATING PATTERNS FOR AIRCRAFT

(71) Applicant: RTX Corporation, Farmington, CT (US)

(72) Inventors: Jeffrey T. Morton, Manchester, CT (US); Jon E. Sobanski, Glastonbury, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/016,778

(22) Filed: Jan. 10, 2025

(65) Prior Publication Data

US 2026/0200583 A1 Jul. 16, 2026

(51) Int. Cl.
*B64D 27/20* (2006.01)
*B64D 27/18* (2006.01)
*F01D 15/10* (2006.01)

(52) U.S. Cl.
CPC ............. *B64D 27/20* (2013.01); *B64D 27/18* (2013.01); *F01D 15/10* (2013.01); *F05D 2260/4031* (2013.01)

(58) Field of Classification Search
CPC ......... B64D 27/20; B64D 27/18; F01D 15/10; F05D 2260/4031
See application file for complete search history.

(56) References Cited

U.S. PATENT DOCUMENTS 4,728,261 A 3/1988 Wright
4,765,135 A 8/1988 Lardellier
4,936,748 A 6/1990 Adamson
5,090,869 A 2/1992 Wright
8,402,740 B2 3/2013 Guemmer
8,701,381 B2 4/2014 Eames
(Continued)

FOREIGN PATENT DOCUMENTS

DE 102015209148 A1 10/2016

OTHER PUBLICATIONS

D.E Gray et al: "Energy Efficient Engine Program technology benefit/cost study, vol. 2", Oct. 1, 1983 (Oct. 1, 1983), United States; Retrieved from the Internet: URL: https://ntrs.nasa.gov/archive/nasa/casi.ntrs.nasa.gov/19900019249.pdf.
(Continued)

*Primary Examiner* — Michael L Sehn
(74) *Attorney, Agent, or Firm* — Getz Balich LLC

(57) ABSTRACT

An aircraft assembly includes first and second propulsion systems. Each propulsion system includes an open propulsor rotor and a turbine engine configured to drive rotation of the open propulsor rotor. The turbine engine includes a compressor section, a combustor section, a turbine section, a first rotating structure, a second rotating structure and a flowpath. The flowpath extends through the compressor section, the combustor section and the turbine section with the first bladed rotor disposed between the second bladed rotor and the combustor section along the flowpath. The open propulsor rotor of the first propulsion system is configured to rotate a first rotational direction. The open propulsor rotor of the second propulsion system is configured to rotate a second rotational direction that is opposite the first rotational direction.

20 Claims, 8 Drawing Sheets

(56) References Cited

U.S. PATENT DOCUMENTS

| | | | | |
|---|---|---|---|---|
| 8,740,565 | B2 | 6/2014 | Perkinson | |
| 9,701,395 | B2 | 7/2017 | Veilleux, Jr. | |
| 9,869,248 | B2 | 1/2018 | Suciu | |
| 10,202,941 | B2 | 2/2019 | Suciu | |
| 10,351,252 | B2 | 7/2019 | Reigner | |
| 10,473,035 | B2 | 11/2019 | Brault | |
| 11,111,790 | B2 | 9/2021 | Cooper | |
| 11,618,580 | B2 * | 4/2023 | Zatorski | F01D 15/10 701/3 |
| 11,834,954 | B2 | 12/2023 | Ostdiek | |
| 2021/0108597 | A1 | 4/2021 | Ostdiek | |
| 2021/0231058 | A1 | 7/2021 | Plante | |
| 2022/0063793 | A1 | 3/2022 | Freely | |
| 2022/0074349 | A1 | 3/2022 | Valois | |
| 2023/0085244 | A1 | 3/2023 | Miller | |
| 2023/0250755 | A1 | 8/2023 | Sibbach | |
| 2024/0017841 | A1 | 1/2024 | Freer | |
| 2024/0017842 | A1 | 1/2024 | Freer | |
| 2024/0017847 | A1 | 1/2024 | Freer | |

OTHER PUBLICATIONS

EP Search Report for EP Patent Application No. 26151393.1 dated Jun. 5, 2026.

* cited by examiner

SYMMETRIC OPEN PROPULSOR ROTATING PATTERNS FOR AIRCRAFT

BACKGROUND OF THE DISCLOSURE

1. Technical Field

This disclosure relates generally to an aircraft and, more particularly, to propulsion systems for the aircraft.

2. Background Information

Various types and configurations of aircraft propulsion systems are known in the art including those with one or more open propulsor rotors. While these known aircraft propulsion systems have various benefits, there is still room in the art for improvement.

SUMMARY OF THE DISCLOSURE

According to an aspect of the present disclosure, an assembly is provided for an aircraft that includes a first propulsion system and a second propulsion system. Each of the first propulsion system and the second propulsion system includes an open propulsor rotor and a turbine engine configured to drive rotation of the open propulsor rotor. The open propulsor rotor includes a plurality of open propulsor blades. The turbine engine includes a compressor section, a combustor section, a turbine section, a first rotating structure, a second rotating structure and a flowpath. The first rotating structure includes a first bladed rotor. The second rotating structure includes a second bladed rotor and is operable to rotate independent of the first rotating structure. The flowpath extends through the compressor section, the combustor section and the turbine section with the first bladed rotor disposed between the second bladed rotor and the combustor section along the flowpath. The open propulsor rotor of the first propulsion system is configured to rotate a first rotational direction and has a first propulsor rotation parameter equal to positive one. The open propulsor rotor of the second propulsion system is configured to rotate a second rotational direction, that is opposite the first rotational direction, and has a second propulsor rotation parameter equal to negative one. The first bladed rotor of the first propulsion system has a first system first rotor rotation parameter equal to positive one where the first bladed rotor of the first propulsion system is configured to rotate in the first rotational direction or negative one where the first bladed rotor of the first propulsion system is configured to rotate in the second rotational direction. The first bladed rotor of the second propulsion system has a second system first rotor rotation parameter equal to positive one where the first bladed rotor of the second propulsion system is configured to rotate in the first rotational direction or negative one where the first bladed rotor of the second propulsion system is configured to rotate in the second rotational direction. The second bladed rotor of the first propulsion system has a first system second rotor rotation parameter equal to positive one where the second bladed rotor of the first propulsion system is configured to rotate in the first rotational direction or negative one where the second bladed rotor of the first propulsion system is configured to rotate in the second rotational direction. The second bladed rotor of the second propulsion system has a second system second rotor rotation parameter equal to positive one where the second bladed rotor of the second propulsion system is configured to rotate in the first rotational direction or negative one where the second bladed rotor of the second propulsion system is configured to rotate in the second rotational direction. A sum of the first propulsor rotation parameter, the second propulsor rotation parameter, the first system first rotor rotation parameter, the second system first rotor rotation parameter, the first system second rotor rotation parameter and the second system second rotor rotation parameter is equal to zero.

According to another aspect of the present disclosure, another assembly is provided for an aircraft that includes a first propulsion system and a second propulsion system. Each of the first propulsion system and the second propulsion system includes an open propulsor rotor and a turbine engine configured to drive rotation of the open propulsor rotor. The open propulsor rotor includes a plurality of open propulsor blades. The turbine engine includes a compressor section, a combustor section, a turbine section, a first rotating structure, a second rotating structure and a flowpath. The first rotating structure includes a first bladed rotor. The second rotating structure includes a second bladed rotor and is operable to rotate independent of the first rotating structure. The flowpath extends through the compressor section, the combustor section and the turbine section with the first bladed rotor disposed between the second bladed rotor and the combustor section along the flowpath. The open propulsor rotor of the first propulsion system is configured to rotate a first rotational direction and has a first propulsor rotation parameter equal to positive one. The open propulsor rotor of the second propulsion system is configured to rotate a second rotational direction, that is opposite the first rotational direction, and has a second propulsor rotation parameter equal to negative one. The first bladed rotor of the first propulsion system has a first system first rotor rotation parameter equal to positive one where the first bladed rotor of the first propulsion system is configured to rotate in the first rotational direction or negative one where the first bladed rotor of the first propulsion system is configured to rotate in the second rotational direction. The first bladed rotor of the second propulsion system has a second system first rotor rotation parameter equal to positive one where the first bladed rotor of the second propulsion system is configured to rotate in the first rotational direction or negative one where the first bladed rotor of the second propulsion system is configured to rotate in the second rotational direction. The second bladed rotor of the first propulsion system has a first system second rotor rotation parameter equal to positive one where the second bladed rotor of the first propulsion system is configured to rotate in the first rotational direction or negative one where the second bladed rotor of the first propulsion system is configured to rotate in the second rotational direction. The second bladed rotor of the second propulsion system has a second system second rotor rotation parameter equal to positive one where the second bladed rotor of the second propulsion system is configured to rotate in the first rotational direction or negative one where the second bladed rotor of the second propulsion system is configured to rotate in the second rotational direction. A product of the first propulsor rotation parameter, the first system first rotor rotation parameter and the first system second rotor rotation parameter is equal to a first value. A product of the second propulsor rotation parameter, the second system first rotor rotation parameter and the second system second rotor rotation parameter is equal to a second value. A sum of the first value and the second value is equal to zero.

According to still another aspect of the present disclosure, another assembly is provided for an aircraft that includes a first propulsion system and a second propulsion system. Each of the first propulsion system and the second propulsion system includes an open propulsor rotor and a turbine engine configured to drive rotation of the open propulsor rotor. The turbine engine includes a compressor section, a combustor section, a turbine section, a first rotating structure, a second rotating structure and a flowpath. The first rotating structure includes a first bladed rotor. The second rotating structure includes a second bladed rotor and is operable to rotate independent of the first rotating structure. The flowpath extends through the compressor section, the combustor section and the turbine section with the first bladed rotor disposed between the second bladed rotor and the combustor section along the flowpath. The open propulsor rotor of the first propulsion system is configured to rotate a first rotational direction and has a first propulsor rotation parameter equal to positive one. The open propulsor rotor of the second propulsion system is configured to rotate a second rotational direction, that is opposite the first rotational direction, and has a second propulsor rotation parameter equal to negative one. The first bladed rotor of the first propulsion system has a first system first rotor rotation parameter equal to positive one where the first bladed rotor of the first propulsion system is configured to rotate in the first rotational direction or negative one where the first bladed rotor of the first propulsion system is configured to rotate in the second rotational direction. The first bladed rotor of the second propulsion system has a second system first rotor rotation parameter equal to positive one where the first bladed rotor of the second propulsion system is configured to rotate in the first rotational direction or negative one where the first bladed rotor of the second propulsion system is configured to rotate in the second rotational direction. The second bladed rotor of the first propulsion system has a first system second rotor rotation parameter equal to positive one where the second bladed rotor of the first propulsion system is configured to rotate in the first rotational direction or negative one where the second bladed rotor of the first propulsion system is configured to rotate in the second rotational direction. The second bladed rotor of the second propulsion system has a second system second rotation parameter equal to positive one where the second bladed rotor of the second propulsion system is configured to rotate in the first rotational direction or negative one where the second bladed rotor of the second propulsion system is configured to rotate in the second rotational direction. An absolute value of a sum of the first propulsor rotation parameter, the second propulsor rotation parameter, the first system first rotor rotation parameter, the second system first rotor rotation parameter, the first system second rotor rotation parameter and the second system second rotor rotation parameter is equal to or less than two. A product of the first propulsor rotation parameter, the first system first rotor rotation parameter and the first system second rotor rotation parameter is equal to a first value. A product of the second propulsor rotation parameter, the second system first rotor rotation parameter and the second system second rotor rotation parameter is equal to a second value. A sum of the first value and the second value is equal to zero.

The turbine engine of the first propulsion system may also include a first engine third rotating structure operatively coupled to the open propulsor rotor of the first propulsion system. The first engine third rotating structure may include a first engine third structure bladed rotor disposed within the turbine section of the first propulsion system. The first engine third structure bladed rotor may have a first system third rotor rotation parameter equal to positive one where the first engine third structure bladed rotor is configured to rotate in the first rotational direction or negative one where the first engine third structure bladed rotor is configured to rotate in the second rotational direction. The turbine engine of the second propulsion system may also include a second engine third rotating structure operatively coupled to the open propulsor rotor of the second propulsion system. The second engine third rotating structure may include a second engine third structure bladed rotor disposed within the turbine section of the second propulsion system. The second engine third structure bladed rotor may have a second system third rotor rotation parameter equal to positive one where the second engine third structure bladed rotor is configured to rotate in the first rotational direction or negative one where the second engine third structure bladed rotor is configured to rotate in the second rotational direction. A product of the first propulsor rotation parameter, the first system first rotor rotation parameter, the first system second rotor rotation parameter and the first system third rotor rotation parameter may be equal to a third value. A product of the second propulsor rotation parameter, the second system first rotor rotation parameter, the second system second rotor rotation parameter and the second system third rotor rotation parameter may be equal to a fourth value. A sum of the third value and the fourth value may be equal to zero.

The open propulsor rotor may include at least nine of the open propulsor blades.

The open propulsor rotor may include at least twelve of the open propulsor blades.

The first bladed rotor of the first propulsion system and the first bladed rotor of the second propulsion system may be configured to rotate in a common rotational direction.

The first bladed rotor of the first propulsion system and the first bladed rotor of the second propulsion system may be configured to rotate in opposite rotational directions.

The second bladed rotor of the first propulsion system and the second bladed rotor of the second propulsion system may be configured to rotate in a common rotational direction.

The second bladed rotor of the first propulsion system and the second bladed rotor of the second propulsion system may be configured to rotate in opposite rotational directions.

The first bladed rotor of each of the first propulsion system and the second propulsion system may be configured as or otherwise include a first bladed compressor rotor. The second bladed rotor of each of the first propulsion system and the second propulsion system may be configured as or otherwise include a second bladed compressor rotor.

The first bladed rotor of each of the first propulsion system and the second propulsion system may be configured as or otherwise include a first bladed turbine rotor. The second bladed rotor of each of the first propulsion system and the second propulsion system may be configured as or otherwise include a second bladed turbine rotor.

The first bladed rotor of the first propulsion system may be next to the second bladed rotor of the first propulsion system along the flowpath of the first propulsion system. The first bladed rotor of the second propulsion system may be next to the second bladed rotor of the second propulsion system along the flowpath of the second propulsion system.

The second rotating structure of the first propulsion system may be operatively coupled to and configured to drive the rotation of the open propulsor rotor of the first propulsion system. The second rotating structure of the second propulsion system may be operatively coupled to and configured to drive the rotation of the open propulsor rotor of the second propulsion system.

The turbine engine of the first propulsion system may also include a first engine third rotating structure operatively coupled to the open propulsor rotor of the first propulsion system. The first engine third rotating structure may include a first engine third structure bladed rotor disposed within the turbine section of the first propulsion system. The first engine third structure bladed rotor may have a first system third rotor rotation parameter equal to positive one where the first engine third structure bladed rotor is configured to rotate in the first rotational direction or negative one where the first engine third structure bladed rotor is configured to rotate in the second rotational direction. The turbine engine of the second propulsion system may also include a second engine third rotating structure operatively coupled to the open propulsor rotor of the second propulsion system. The second engine third rotating structure may include a second engine third structure bladed rotor disposed within the turbine section of the second propulsion system. The second engine third structure bladed rotor may have a second system third rotor rotation parameter equal to positive one where the second engine third structure bladed rotor is configured to rotate in the first rotational direction or negative one where the second engine third structure bladed rotor is configured to rotate in the second rotational direction. An absolute value of a sum of the first propulsor rotation parameter, the second propulsor rotation parameter, the first system first rotor rotation parameter, the second system first rotor rotation parameter, the first system second rotor rotation parameter, the second system second rotor rotation parameter, the first system third rotor rotation parameter and the second system third rotor rotation parameter may be equal to or less than two.

The sum of the first propulsor rotation parameter, the second propulsor rotation parameter, the first system first rotor rotation parameter, the second system first rotor rotation parameter, the first system second rotor rotation parameter, the second system second rotor rotation parameter, the first system third rotor rotation parameter and the second system third rotor rotation parameter may be equal to zero.

The turbine engine of each of the first propulsion system and the second propulsion system may be configured as a two-spool engine.

The turbine engine of each of the first propulsion system and the second propulsion system may be configured as a three-spool engine.

Each of the first propulsion system and the second propulsion system may also include an open guide vane structure next to the open propulsor rotor.

Each of the first propulsion system and the second propulsion system may also include a geared drivetrain operatively coupling the open propulsor rotor to the turbine engine.

The assembly may also include an aircraft airframe comprising an aircraft fuselage. The first propulsion system and the second propulsion system may be mounted to the aircraft airframe and arranged to opposing lateral sides of the aircraft fuselage.

The open propulsor rotor of each of the first propulsion system and the second propulsion system may include at least twelve of the open propulsor blades.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
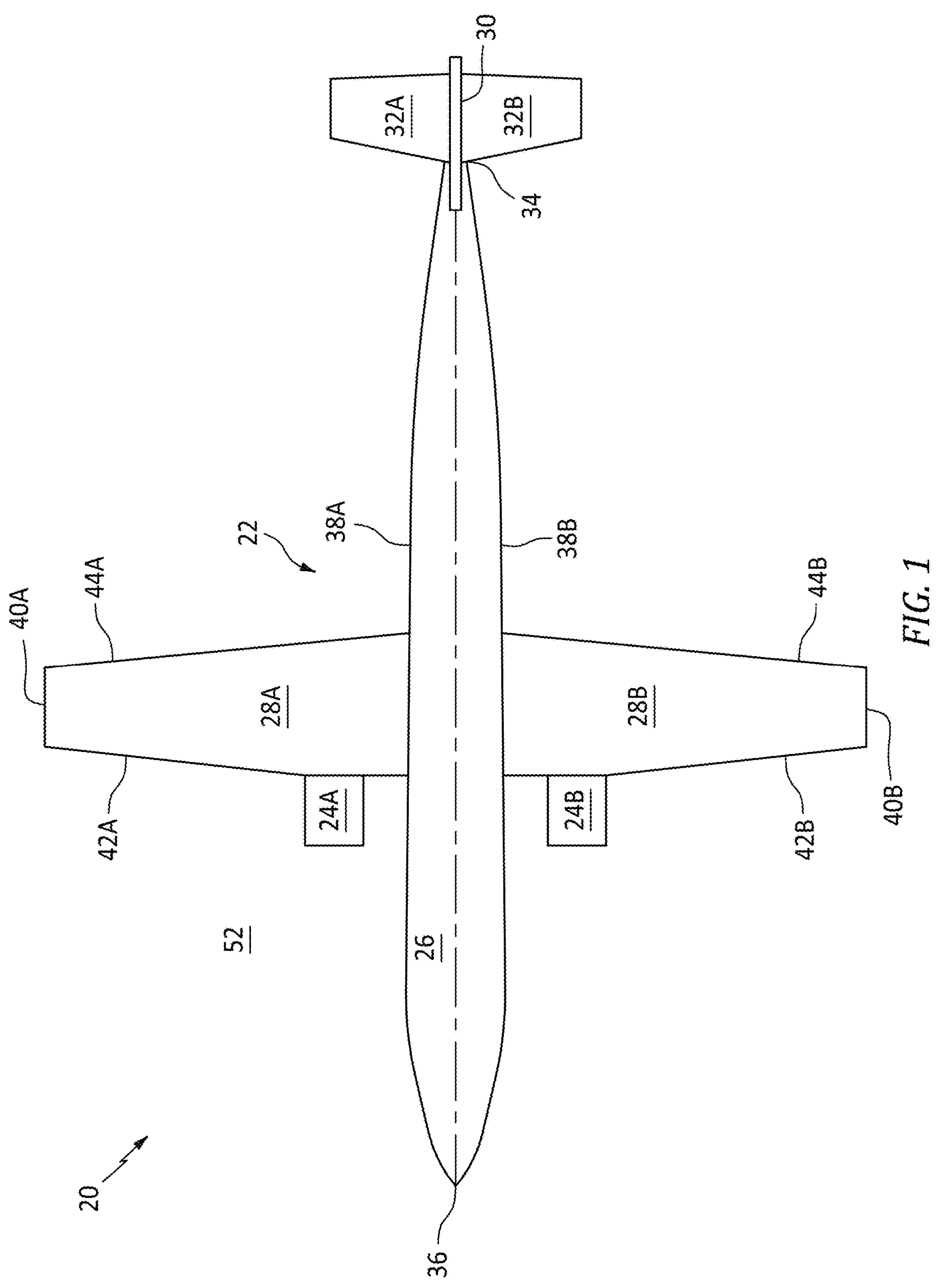
FIG. 1 is a schematic illustration of an aircraft with multiple propulsion systems mounted to wings of the aircraft.

FIG. 1 is a schematic illustration of an aircraft 20. This aircraft 20 may be an airplane, a drone (e.g., an unmanned aerial vehicle (UAV)), or any other manned or unmanned aerial vehicle or system. The aircraft 20 includes an aircraft airframe 22 and one or more aircraft propulsion systems 24A and 24B (generally referred to as "24"); e.g., a pair of companion aircraft propulsion systems.

The aircraft airframe 22 of FIG. 1 includes an aircraft fuselage 26 and one or more aircraft wings 28A and 28B (generally referred to as "28"). This aircraft airframe 22 may also include one or more aircraft stabilizers, such as at least one vertical stabilizer 30 and one or more horizontal stabilizers 32A and 32B arranged at (e.g., on, adjacent or proximate) an aft, downstream tail end 34 of the aircraft fuselage 26. However, in other embodiments, it is contemplated one or more of the aircraft stabilizers 30, 32A and/or 32B may be omitted where, for example, the aircraft 20 is alternatively configured as a blended wing aircraft.

The aircraft fuselage 26 extends longitudinally along a longitudinal centerline of the aircraft airframe 22 and its aircraft fuselage 26 from a forward, upstream nose end 36 of the aircraft airframe 22 and its aircraft fuselage 26 to the fuselage tail end 34. The aircraft fuselage 26 extends laterally between and to opposing lateral sides 38A and 38B (generally referred to as "38") of the aircraft fuselage 26.

The aircraft wings 28A and 28B are arranged to the opposing lateral sides 38A and 38B of the aircraft fuselage 26. The first aircraft wing 28A of FIG. 1, for example, is connected to the aircraft fuselage 26 at the fuselage first side 38A. The second aircraft wing 28B is connected to the aircraft fuselage 26 at the fuselage second side 38B. The aircraft fuselage 26 of FIG. 1 is thereby located laterally between the first aircraft wing 28A and the second aircraft wing 28B. Each of these aircraft wings 28A and 28B projects spanwise out from the aircraft fuselage 26 to a tip 40A, 40B of the respective aircraft wing 28A, 28B. Each of the aircraft wings 28A and 28B extends longitudinally between and to a leading edge 42A, 42B of the respective aircraft wing 28A, 28B and a trailing edge 44A, 44B of the respective aircraft wing 28A, 28B.

Figure 2:
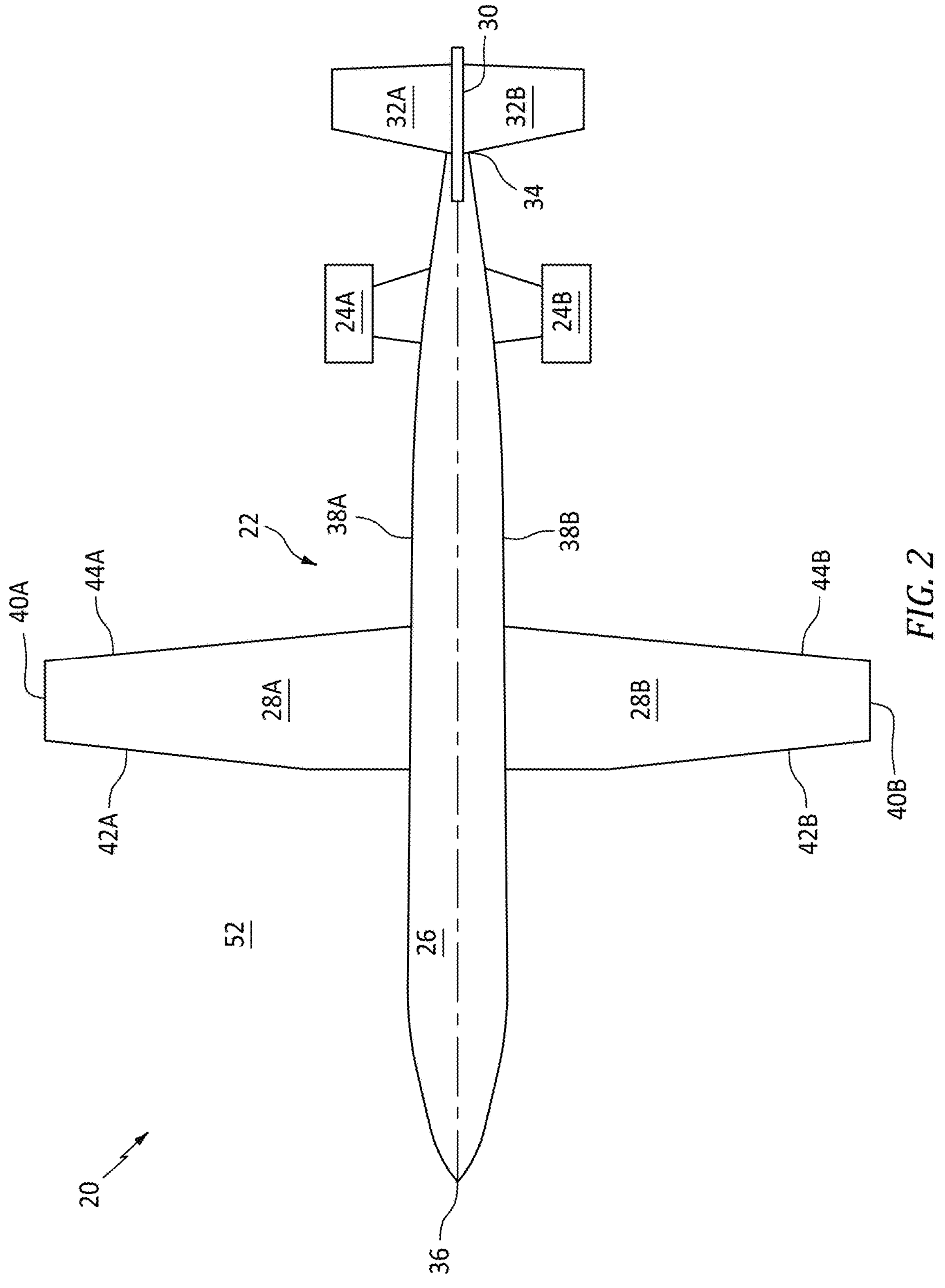
FIG. 2 is a schematic illustration of the aircraft with its propulsion systems mounted to a fuselage of the aircraft.

The aircraft propulsion systems 24A and 24B of FIG. 1 are arranged to the opposing lateral sides 38A and 38B of the aircraft fuselage 26. The first aircraft propulsion system 24A of FIG. 1, for example, is mounted to the first aircraft wing 28A. The second aircraft propulsion system 24B is mounted to the second aircraft wing 28B. The aircraft fuselage 26 of FIG. 1 is thereby located laterally between the first aircraft propulsion system 24A and the second aircraft propulsion system 24B. The present disclosure, however, is not limited to such an exemplary arrangement. For example, referring to FIG. 2, the first aircraft propulsion system 24A may alternatively be mounted to the aircraft fuselage 26 at the fuselage first side 38A. The second aircraft propulsion system 24B may alternatively be mounted to the aircraft fuselage 26 at the fuselage second side 38B.

Figure 3:
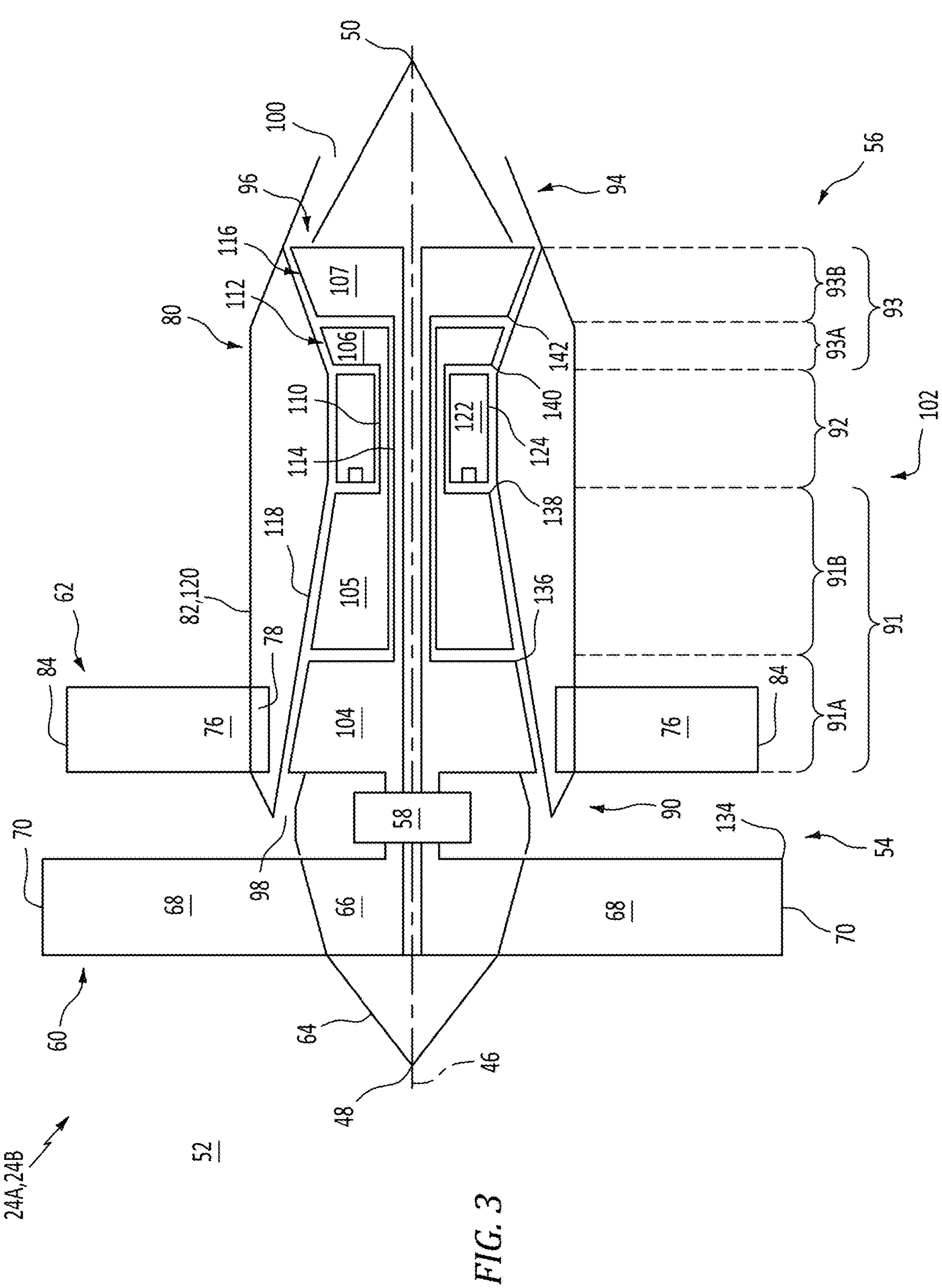
FIG. 3 is a schematic illustration of an exemplary one of the propulsion systems.

Referring to FIG. 3, each aircraft propulsion system 24 extends axially along an axis 46 between an upstream, forward end 48 of the aircraft propulsion system 24 and a downstream, aft end 50 of the aircraft propulsion system 24. The propulsion system axis 46 may be a centerline axis of the respective aircraft propulsion system 24 and/or a centerline axis of one or more members of the respective aircraft propulsion system 24. The propulsion system axis 46 may also or alternatively be a rotational axis of one or more members of the respective aircraft propulsion system 24.

Each aircraft propulsion system 24 may be configured as an open rotor propulsion system with a single open rotor and swirl recovery vane (SRV) architecture. Herein, the term "open" may describe a propulsion system section and/or a propulsion system component which is open to an environment 52 (e.g., an ambient environment) external to the aircraft propulsion system 24 and, more generally, the aircraft 20. The aircraft propulsion system 24 of FIG. 3, for example, includes an open rotor propulsion section 54, a gas turbine engine 56 and a geartrain 58.

The propulsion section 54 of FIG. 3 includes an open propulsor rotor 60 and an open guide vane structure 62. These propulsion section members 60 and 62 are un-ducted components of the aircraft propulsion system 24 and its propulsion section 54. The propulsion section 54 of FIG. 3 also includes a nose cone 64 disposed at (e.g., on, adjacent or proximate) the propulsion system forward end 48. Briefly, this nose cone 64 may be configured as a spinner which is rotatable with the propulsor rotor 60 about the propulsion system axis 46. Alternatively, the nose cone 64 may be configured as a stationary structure of the propulsion section 54.

The propulsor rotor 60 includes a rotor base 66 (e.g., a disk or a hub) and a plurality of open propulsor blades 68 (e.g., airfoils). The propulsor blades 68 are arranged and may be equispaced circumferentially about the rotor base 66 and the propulsion system axis 46 in an array (e.g., a circular array), which array of propulsor blades 68 may be unshrouded or alternatively shrouded by a tubular propulsor rotor shroud dedicated to the propulsor rotor for example. Each of the propulsor blades 68 is connected to (e.g., formed integral with or otherwise attached to) the rotor base 66. Each of the propulsor blades 68 projects spanwise along a span line of the respective propulsor blade 68 (e.g., radially relative to the propulsion system axis 46) out from an exterior surface of the rotor base 66, into the external environment 52, to a distal tip 70 of the respective propulsor blade 68. Each propulsor blade 68 is thereby configured as an un-ducted propulsor blade which is exposed to (e.g., disposed in) the surrounding external environment 52.

Figure 4:
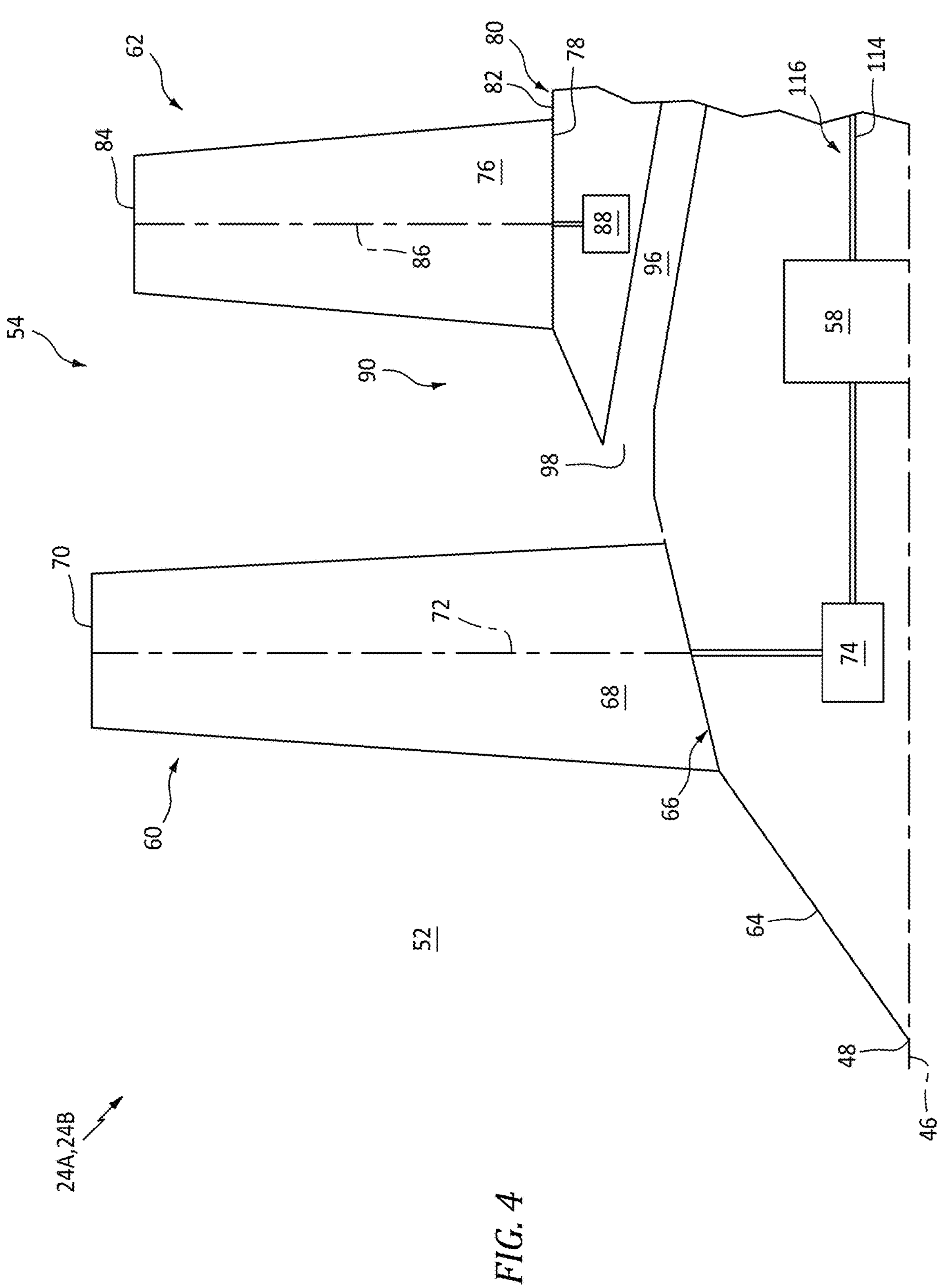
FIG. 4 is a schematic illustration of a portion of the propulsion system of FIG. 3 at a propulsion section.

Referring to FIG. 4, each propulsor blade 68 may be configured to pivot about a respective blade pivot axis 72. This blade pivot axis 72 extends radially relative to the propulsion system axis 46. The blade pivot axis 72 of FIG. 4, for example, is arranged perpendicular to the propulsion system axis 46 when viewed, for example, in a longitudinal reference plane parallel to (e.g., including) the propulsion system axis 46; e.g., the plane of FIG. 4. Each propulsor blade 68 of FIG. 4 is operatively coupled with a blade actuation system 74. This blade actuation system 74 is configured to pivot each propulsor blade 68 about its own respective blade pivot axis 72. By pivoting each propulsor blade 68 about its blade pivot axis 72, a pitch of the respective propulsor blade 68 may be changed. Note, while the blade pivot axis 72 is shown in FIG. 4 as being perpendicular to the propulsion system axis 46, it is contemplated this blade pivot axis 72 may or may not be coincident with the propulsion system axis 46. Moreover, it is contemplated each blade pivot axis 72 may alternatively be angularly offset from the propulsion system axis 46 by an acute angle or an obtuse angle when viewed, for example, in the longitudinal reference plane. Of course, it is contemplated some or all of the propulsor blades 68 may be alternatively moved to change the propulsor blade pitch. Moreover, it is contemplated some or all of the propulsor blades 68 may alternatively be fixed pitch propulsor blades in other embodiments.

The guide vane structure 62 of FIG. 3 includes a plurality of open exit guide vanes 76 (e.g., airfoils) that are arranged and may be equispaced circumferentially about the propulsion system axis 46 in an array (e.g., a circular array), which array of guide vanes 76 may be unshrouded or alternatively shrouded by a tubular guide vane shroud dedicated to the guide vane structure 62 for example. The guide vane structure 62 and its guide vanes 76 are arranged axially next to (e.g., adjacent) the propulsor rotor 60 and its propulsor blades 68. The guide vane structure 62 and its guide vanes 76 of FIG. 3, for example, are arranged downstream of the propulsor rotor 60 and its propulsor blades 68, without (e.g., any) other elements axially therebetween to obstruct, turn and/or otherwise influence the air propelled by the propulsor rotor 60 to the guide vane structure 62 for example. Each of the guide vanes 76 of FIG. 3 is coupled to a support structure 78 of a stationary housing structure 80 for the aircraft propulsion system 24. This support structure 78 may be configured as or otherwise include a support frame, a case and/or another fixed structure of the housing structure 80. Each of the guide vanes 76 projects spanwise along a span line of the respective guide vane 76 (e.g., radially relative to the propulsion system axis 46) out from an exterior surface 82 of the housing structure 80, into the external environment 52, to a distal tip 84 of the respective guide vane 76. Here, the exterior surface 82 radially borders the external environment 52 and forms an exterior aerodynamic flow surface of the aircraft propulsion system 24. Each guide vane 76 is thereby configured as an un-ducted guide vane which is exposed to (e.g., disposed in) the surrounding external environment 52.

Referring to FIG. 4, each guide vane 76 may be configured to pivot about a respective vane pivot axis 86. This vane pivot axis 86 extends radially relative to the propulsion system axis 46. The vane pivot axis 86 of FIG. 4, for example, is arranged perpendicular to the propulsion system axis 46 when viewed, for example, in the longitudinal reference plane. Each guide vane 76 of FIG. 4 is operatively coupled with a vane actuation system 88, which vane actuation system 88 may be discrete from or integrated as part of the blade actuation system 74. The vane actuation system 88 is configured to pivot each guide vane 76 about its own respective vane pivot axis 86. By pivoting each guide vane 76 about its vane pivot axis 86, a pitch of the respective guide vane 76 may be changed. Note, while the vane pivot axis 86 is shown in FIG. 4 as being perpendicular to the propulsion system axis 46, it is contemplated this vane pivot axis 86 may or may not be coincident with the propulsion system axis 46. Moreover, it is contemplated each vane pivot axis 86 may alternatively be angularly offset from the propulsion system axis 46 by an acute angle or an obtuse angle when viewed, for example, in the longitudinal reference plane. Of course, it is contemplated some or all of the guide vanes 76 may be alternatively moved to change the guide vane pitch. Moreover, it is contemplated some or all of the guide vanes 76 may alternatively be fixed pitch guide vanes in other embodiments.

Referring to FIG. 3, the turbine engine 56 includes an inlet section 90, a compressor section 91, a combustor section 92, a turbine section 93 and an exhaust section 94. The compressor section 91 of FIG. 3 includes a low pressure compressor (LPC) section 91A and a high pressure compressor (HPC) section 91B. The turbine section 93 of FIG. 3 includes a high pressure turbine (HPT) section 93A and a low pressure turbine (LPT) section 93B. The turbine engine 56 also includes an (e.g., annular) engine flowpath 96 which extends longitudinally through the aircraft propulsion system 24 of FIG. 3 and its turbine engine 56 from an airflow inlet 98 into the engine flowpath 96 to a combustion products exhaust 100 from the engine flowpath 96. The flowpath inlet 98 is also an airflow inlet into the aircraft propulsion system 24 of FIG. 3 and its turbine engine 56. The flowpath exhaust 100 is also a combustion products exhaust from the aircraft propulsion system 24 of FIG. 3 and its turbine engine 56. At least (or only) the LPC section 91A, the HPC section 91B, the combustor section 92, the HPT section 93A and the LPT section 93B collectively form a core 102 (e.g., a gas generator) of the turbine engine 56.

The LPC section 91A includes a bladed low pressure compressor (LPC) rotor 104. The HPC section 91B includes a bladed high pressure compressor (HPC) rotor 105. The HPT section 93A includes a bladed high pressure turbine (HPT) rotor 106. The LPT section 93B includes a bladed low pressure turbine (LPT) rotor 107. Each of these bladed rotor 104-107 may be a ducted and/or shrouded engine rotor. Each of the engine rotors 104-107 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 96. Each of the rotor blades is connected to the respective rotor base. Each of the rotor blades projects radially (e.g., spanwise) out from the respective rotor base into the engine flowpath 96 and to a distal tip of the respective rotor blade.

The HPC rotor 105 is coupled to and rotatable with the HPT rotor 106. The HPC rotor 105 of FIG. 3, for example, is connected to the HPT rotor 106 by a high speed shaft 110. At least (or only) the HPC rotor 105, the HPT rotor 106 and the high speed shaft 110 collectively form a high speed rotating structure 112; e.g., a high speed spool of the turbine engine 56 and its engine core 102. This high speed rotating structure 112 of FIG. 3 and its members 105, 106 and 110 are rotatable about the propulsion system axis 46. However, in other embodiments, the high speed rotating structure 112 and its members 105, 106 and 110 may alternatively be rotatable about another rotational axis which is (e.g., radially and/or angularly) offset from the rotational axis of the propulsor rotor 60.

The LPC rotor 104 is coupled to and rotatable with the LPT rotor 107. The LPC rotor 104 of FIG. 3, for example, is connected to the LPT rotor 107 by a low speed shaft 114. At least (or only) the LPC rotor 104, the LPT rotor 107 and the low speed shaft 114 collectively form a low speed rotating structure 116; e.g., a low speed spool of the turbine engine 56 and its engine core 102. This low speed rotating structure 116 of FIG. 3 and its members 104, 107 and 114 are rotatable about the propulsion system axis 46. However, in other embodiments, the low speed rotating structure 116 and its members 104, 107 and 114 may alternatively be rotatable about another rotational axis which is (e.g., radially and/or angularly) offset from the rotational axis of the propulsor rotor 60.

The low speed rotating structure 116 is coupled to the propulsor rotor 60 through the geartrain 58. This geartrain 58 is disposed between and operatively couples the propulsor rotor 60 to the low speed rotating structure 116 and its LPT rotor 107. With this arrangement, the propulsor rotor 60 may rotate at a different (e.g., slower) rotational speed than the low speed rotating structure 116 and its LPT rotor 107. Depending on the specific configuration of the geartrain 58, the propulsor rotor 60 and the low speed rotating structure 116 may rotate in a common (the same) direction about the propulsion system axis 46 or in opposite directions about the propulsion system axis 46. While the aircraft propulsion system 24 is described above with a geared drivetrain operatively coupling the low speed rotating structure 116 to the propulsor rotor 60, the present disclosure is not limited to such an exemplary configuration. For example, the aircraft propulsion system 24 may alternatively include a direct-drive drivetrain operatively coupling the low speed rotating structure 116 to the propulsor rotor 60. With such an arrangement, the propulsor rotor 60 and the low speed rotating structure 116 and its LPT rotor 107 may rotate at a common rotational speed and in a common direction about the propulsion system axis 46.

The engine sections 90-94 of FIG. 3 are arranged sequentially along the propulsion system axis 46 and are housed within and/or formed by the housing structure 80. This housing structure 80 includes an engine case 118 (e.g., a gas generator case) and a nacelle 120. The engine case 118 houses one or more of the engine sections 91A-93B; e.g., the engine core 102. The engine case 118 of FIG. 3, for example, extends axially along (e.g., axially overlaps) and extends circumferentially about (e.g., circumscribes) the engine sections 91A-93B and the bladed rotors 104-107. The engine case 118 may also house the geartrain 58. The nacelle 120 houses and provides an aerodynamic cover over the engine case 118. An exterior wall of the nacelle 120 of FIG. 3, for example, is disposed radially outboard of, extends axially along (e.g., axially overlaps) and extends circumferentially about (e.g., circumscribes) the engine core 102 and its engine case 118. This nacelle wall may at least partially or completely form the exterior surface 82. With the foregoing arrangement, the bladed rotors 104-107 are disposed within the housing structure 80. By contrast, the propulsor rotor 60 and the guide vane structure 62 are disposed at least partially (or completely) outside of the housing structure 80.

During operation of the aircraft propulsion system 24 of FIG. 3, ambient air within the external environment 52 is propelled by the rotating propulsor rotor 60 in the downstream, aft direction towards the propulsion system aft end 50. A major portion (e.g., more than 50%) of this air bypasses the turbine engine 56 to provide forward thrust while a minor portion (e.g., less than 50%) of the air flows into the turbine engine 56. For example, an outer stream of the air propelled by the rotating propulsor rotor 60 flows axially across the guide vane structure 62 and outside of the housing structure 80 and its exterior surface 82; e.g., along an exterior of the nacelle 120. The guide vane structure 62 conditions (e.g., straightens out, de-swirls, etc.) the outer stream of air within the external environment 52 to enhance the forward thrust. By contrast, an inner stream of the air propelled by the rotating propulsor rotor 60 may bypass the guide vane structure 62 and enter the turbine engine 56 and its engine flowpath 96 through the flowpath inlet 98. The air entering the engine flowpath 96 through the flowpath inlet 98 may be referred to as "core air".

The core air is compressed by the LPC rotor 104 and the HPC rotor 105 and directed into a combustion chamber 122 (e.g., an annular combustion chamber) of a combustor 124 (e.g., an annular combustor) in the combustor section 92. Fuel is injected into the combustion chamber 122 by one or more fuel injectors and mixed with the compressed core air to provide a fuel-air mixture. This fuel-air mixture is ignited and combustion products thereof flow through and sequentially drive rotation of the HPT rotor 106 and the LPT rotor 107. The rotation of the HPT rotor 106 and the LPT rotor 107 respectively drive rotation of the HPC rotor 105 and the LPC rotor 104 and, thus, compression of the core air. The rotation of the LPT rotor 107 also drives the rotation of the propulsor rotor 60 through the geartrain 58. The turbine engine 56 and its low speed rotating structure 116 thereby power operation of (e.g., drive rotation of) the propulsor rotor 60, for example through the geartrain 58 of FIG. 3, during aircraft propulsion system operation.

Figures 5A, 5B, 6:
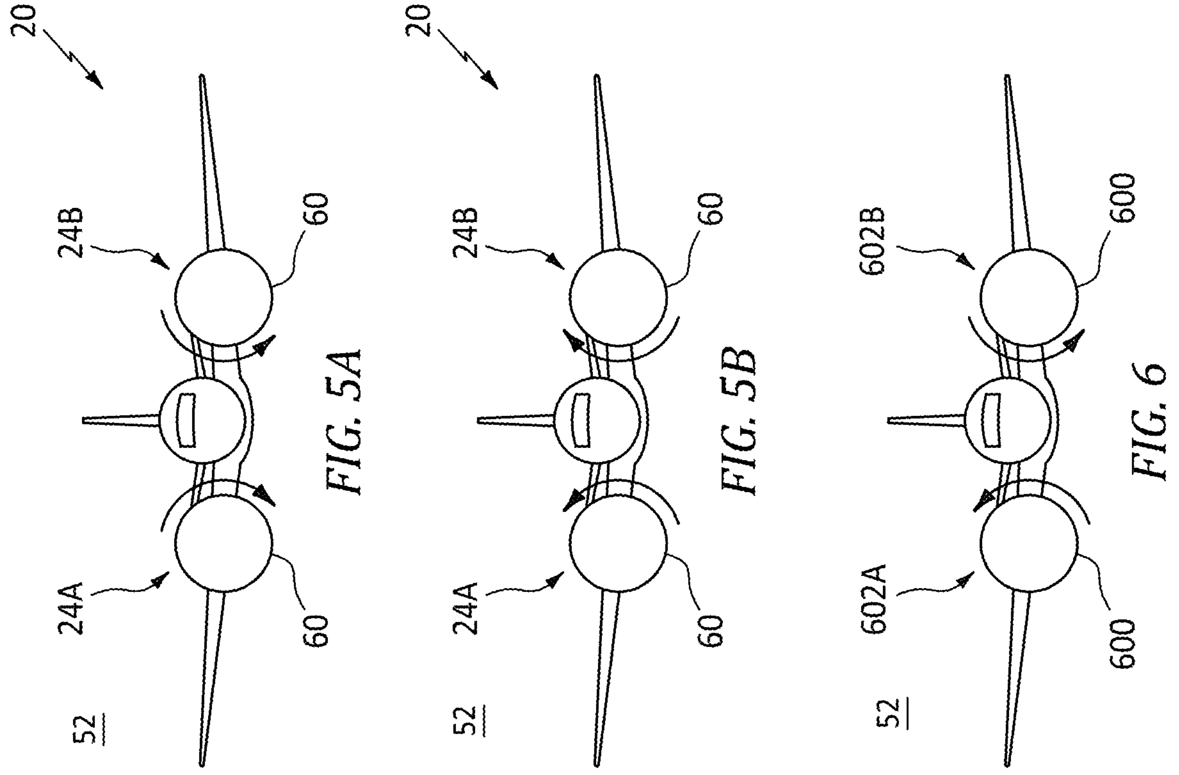
FIGS. 5A and 5B are front view illustrations of the aircraft depicting various symmetric propulsor rotating patterns.
FIG. 6 is a front view illustration of an aircraft depicting an asymmetric propulsor rotating pattern.

The first aircraft propulsion system 24A is configured such that its propulsor rotor 60 rotates in a first rotational direction (e.g., clockwise or counterclockwise) about the respective propulsion system axis 46. By contrast, the second aircraft propulsion system 24B is configured such that its propulsor rotor 60 rotates in a second rotational direction (e.g., counterclockwise or clockwise) about the respective propulsion system axis 46, which second rotational direction is rotationally opposite the first rotational direction. Referring to FIGS. 5A and 5B, the propulsor rotor 60 of the first aircraft propulsion system 24A and the propulsor rotor 60 of the second aircraft propulsion system 24B thereby rotate in different rotational directions during aircraft flight. In FIG. 5A, the propulsor rotors 60 of the aircraft propulsion systems 24A and 24B rotate in an inboard down-down symmetric rotating pattern. In FIG. 5B, the propulsor rotors 60 of the aircraft propulsion systems 24A and 24B rotate in an inboard up-up symmetric rotating pattern. Such symmetric rotating patterns may facilitate a reduction in propulsion system noise, an increase in propulsion system performance, provision of symmetric control surface geometries, etc. By contrast, FIG. 6 illustrates propulsor rotors 600 of right and left side aircraft propulsion systems 602A and 602B rotating in an asymmetric rotating pattern.

In some embodiments, referring to FIG. 3, the aircraft propulsion systems 24A and 24B may be configured with different (e.g., uniquely configured, opposite rotation, etc.) turbine engines 56 to facilitate the symmetric rotating pattern of FIG. 5A or 5B in the aircraft propulsion systems 24A and 24B. For example, where each geartrain 58 is configured such that the rotating components 60 and 116 coupled therewith rotate in a common rotational direction, (a) the low speed rotating structure 116 of the first aircraft propulsion system 24A may be configured to rotate in the first rotational direction and (b) the low speed rotating structure 116 of the second aircraft propulsion system 24B may be configured to rotate in the second rotational direction. In another example, where each geartrain 58 is configured such that the rotating components 60 and 116 coupled therewith rotate in opposite rotational directions, (a) the low speed rotating structure 116 of the first aircraft propulsion system 24A may be configured to rotate in the second rotational direction and (b) the low speed rotating structure 116 of the second aircraft propulsion system 24B may be configured to rotate in the first rotational direction. While such embodiments have various benefits, these embodiments may also lead to duplication of research and development efforts for the two different turbine engines 56 and engine cores 102. Moreover, to maintain a supply of spare parts, two separate supplies of spare parts may need to be maintained, one for each turbine engine/engine core configuration.

In some embodiments, the aircraft propulsion systems 24A and 24B may be configured with different (e.g., uniquely configured) drivetrains operatively coupling the turbine engines 56 to the propulsor rotors 60. For example, the geartrain 58 of the first aircraft propulsion systems 24A may be configured as a counter-rotating geartrain; e.g., a geartrain configured as or otherwise including an epicyclic star gear system. The low speed rotating structure 116 of the first aircraft propulsion system 24A may thereby be configured to rotate in the second rotational direction to facilitate rotation of the associated propulsor rotor 60 in the first rotational direction. By contrast, the geartrain 58 of the second aircraft propulsion systems 24B may be configured as a co-rotating geartrain; e.g., a geartrain configured as or otherwise including an epicyclic planetary gear system. The low speed rotating structure 116 of the second aircraft propulsion system 24B may thereby be configured to rotate in the second rotational direction to facilitate rotation of the associated propulsor rotor 60 in the second rotational direction. In another example, the geartrain 58 of the first aircraft propulsion systems 24A may be configured as a co-rotating geartrain. The low speed rotating structure 116 of the first aircraft propulsion system 24A may thereby be configured to rotate in the first rotational direction to facilitate rotation of the associated propulsor rotor 60 in the first rotational direction. By contrast, the geartrain 58 of the second aircraft propulsion systems 24B may be configured as a counter-rotating geartrain. The low speed rotating structure 116 of the second aircraft propulsion system 24B may thereby be configured to rotate in the first rotational direction to facilitate rotation of the associated propulsor rotor 60 in the second rotational direction. With such embodiments, the aircraft propulsion systems 24A and 24B may share a common turbine engine configuration, a common engine core configuration, or at least one or more common internal core components and/or structures; e.g., the rotating structure(s) 112, 116, the combustor 124, etc. Herein, the term "common" may describe elements which are identical and may share a single manufacturer/supplier part number. Spare parts for the first and second aircraft propulsion systems 24A and 24B may thereby be significantly reduced because a single replacement turbine engine 56, a single replacement engine core 102 and/or a single set of parts may be used with either the first aircraft propulsion system 24A or the second aircraft propulsion system 24B.

Each geartrain 58 of FIG. 3 is generally described above with a single gear system (e.g., a single epicyclic gear system) operatively coupling the low speed rotating structure 116 to the propulsor rotor 60. A centerline of each geartrain 58 is also shown in FIG. 3 as being coaxial with both the low speed rotating structure 116 and the propulsor rotor 60 such that those rotating components 116 and 60 share a common rotational axis; e.g., the propulsion system axis 46. The present disclosure, however, is not limited to such exemplary geartrain arrangements. For example, the geartrain 58 of the first aircraft propulsion systems 24A and/or the second aircraft propulsion systems 24B may alternatively include multiple gear systems (e.g., a serial stack of epicyclic gear systems) operatively coupling the low speed rotating structure 116 to the propulsor rotor 60. In another example, the geartrain 58 of first aircraft propulsion systems 24A and/or second aircraft propulsion systems 24B may also or alternatively be configured as an offset geartrain such that the rotational axis of the low speed rotating structure 116 is offset (e.g., radially and/or angularly offset) from the rotational axis of the propulsor rotor 60.

The engine flowpath 96 of FIG. 3 extends longitudinally from the flowpath inlet 98, sequentially through the inlet section 90, the LPC section 91A, the HPC section 91B, the combustor section 92, the HPT section 93A, the LPT section 93B and the exhaust section 94, to the flowpath exhaust 100. The engine flowpath 96 of FIG. 3 is configured such that the core air and the combustion products generally flow in the aft, downstream direction towards the propulsion system aft end 50. The core air and the combustion products thereby flow along with the ambient air propelled by the rotating propulsor rotor 60 in a common axial direction—the downstream, aft direction. The turbine engine 56 of the present disclosure, however, is not limited to such an exemplary common flow engine arrangement. For example, the engine flowpath 96 may alternatively be configured such that the core air and the combustion products generally flow in a forward, upstream direction towards the propulsion system forward end 48. The core air and the combustion products may thereby flow in an opposite direction as the ambient air propelled by the rotating propulsor rotor 60. Here, the turbine engine 56 may have a reverse flow engine arrangement (e.g., see FIG. 8).

Figure 7:
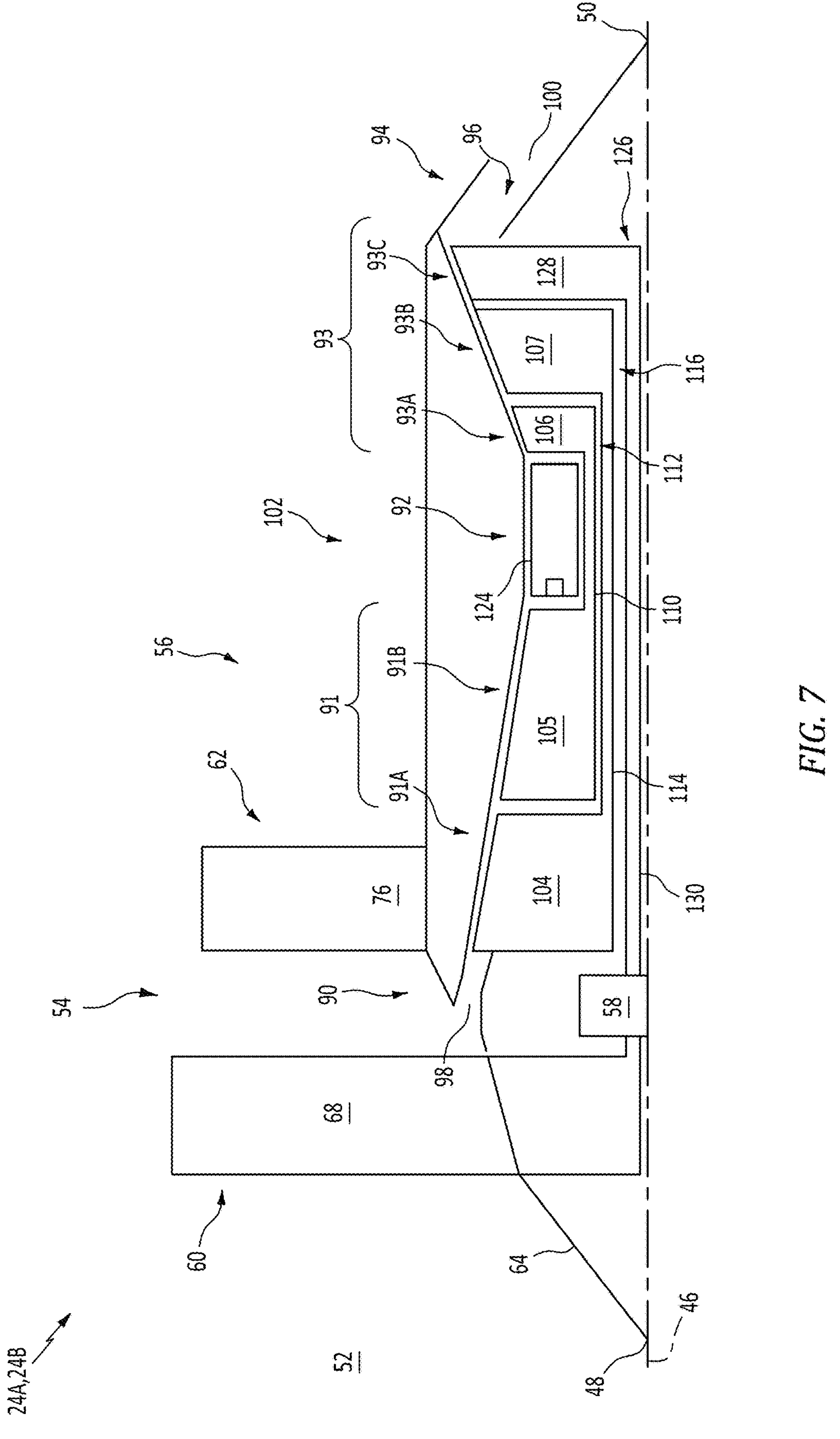
FIG. 7 is a schematic illustration of the propulsion system with an alternative turbine engine arrangement.
Figure 8:
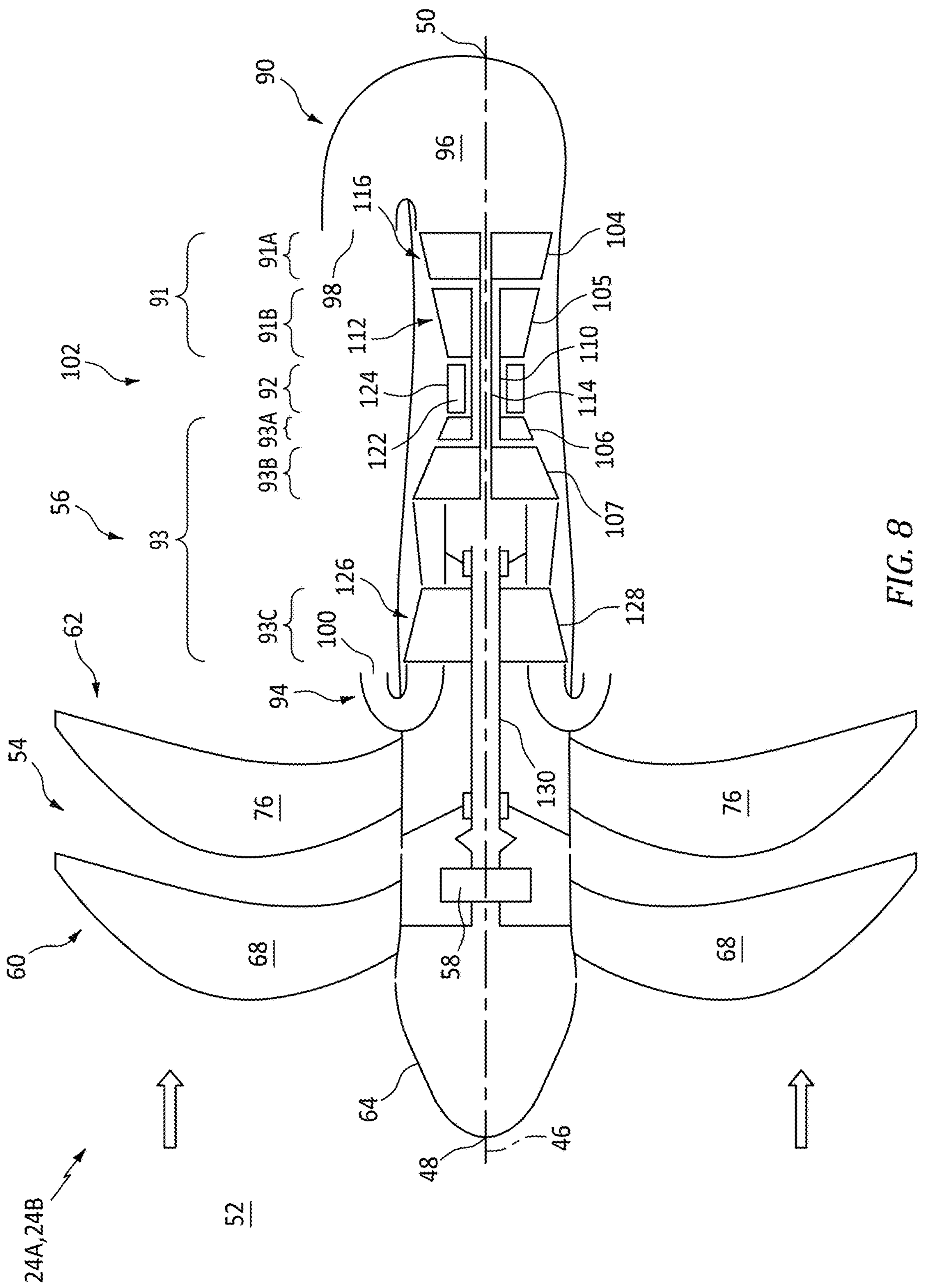
FIG. 8 is a schematic illustration of the propulsion system with another alternative turbine engine arrangement.

The turbine engine 56 of FIG. 3 is generally described above as a two-spool engine. For example, the turbine engine 56 is shown in FIG. 3 as including the high speed rotating structure 112 and the low speed rotating structure 116 as the (e.g., only) spool-type rotating structures in the engine core 102. The present disclosure, however, is not limited to such an exemplary arrangement. For example, referring to FIGS. 7 and 8, the low speed rotating structure 116 may be configured rotationally independent of the propulsor rotor 60. For example, the turbine engine 56 of FIGS. 7 and 8 includes an additional (e.g., a third) rotating structure-a power turbine rotating structure 126. This power turbine rotating structure 126 includes a bladed power turbine (PT) rotor 128 and a power turbine shaft 130 connected to and rotatable with the PT rotor 128. The PT rotor 128 is arranged in a power turbine (PT) section 93C of the turbine section 93, which PT section 93C is located along the engine flowpath 96 between the turbine section 93B and the exhaust section 94. The turbine section 93B may thereby be configured as a low pressure turbine section of the engine core 102 and an intermediate pressure turbine section of the turbine engine 56. However, for ease of description, the turbine section 93B of FIGS. 7 and 8 is still referred to below as the LPT section. The geartrain 58 of FIGS. 7 and 8 operatively couples the power turbine rotating structure 126 and its PT rotor 128 to the propulsor rotor 60. Of course, in other embodiments, it is contemplated the geartrain 58 of FIGS. 7 and 8 may be omitted such that the drivetrain operatively coupling the power turbine rotating structure 126 to the propulsor rotor 60 is a direct-drive drivetrain.

In some embodiments, referring still to FIGS. 7 and 8, the aircraft propulsion systems 24A and 24B may be configured with different (e.g., uniquely configured, opposite rotation, etc.) PT sections 93C to facilitate the symmetric rotating pattern of FIG. 5A or 5B in the aircraft propulsion systems 24A and 24B. For example, where each geartrain 58 is configured such that the rotating components 60 and 126 coupled therewith rotate in a common rotational direction, (a) the power turbine rotating structure 126 of the first aircraft propulsion system 24A may be configured to rotate in the first rotational direction and (b) the power turbine rotating structure 126 of the second aircraft propulsion system 24B may be configured to rotate in the second rotational direction. In another example, where each geartrain 58 is configured such that the rotating components 60 and 126 coupled therewith rotate in opposite rotational directions, (a) the power turbine rotating structure 126 of the first aircraft propulsion system 24A may be configured to rotate in the second rotational direction and (b) the power turbine rotating structure 126 of the second aircraft propulsion system 24B may be configured to rotate in the first rotational direction. With such embodiments, while the PT sections 93C of the turbine engines 56 are unique to the aircraft propulsion systems 24A and 24B, the aircraft propulsion systems 24A and 24B may be configured with common engine cores 102, common geartrains 58, as well as various other common components. Spare parts for the first and second aircraft propulsion systems 24A and 24B may thereby be significantly reduced because a single replacement engine core 102 and/or a single set of other parts may be used with either the first aircraft propulsion system 24A or the second aircraft propulsion system 24B.

As described above, the aircraft propulsion systems 24A and 24B may have various configurations to facilitate the symmetric rotating pattern of FIG. 5A or 5B in the aircraft propulsion systems 24A and 24B. In some embodiments, the rotating structure (e.g., 116 in FIG. 3; 126 in FIGS. 7 and 8) coupled to the propulsor rotor 60 may rotate with the propulsor rotor 60 in a common rotational direction. In some embodiments, the rotating structure (e.g., 116 in FIG. 3; 126 in FIGS. 7 and 8) coupled to the propulsor rotor 60 may rotate with the propulsor rotor 60 in opposite rotational directions. In some embodiments, the rotating structure (e.g., 116 in FIG. 3; 126 in FIGS. 7 and 8) coupled to the propulsor rotor 60 may rotate with one or more of the core rotating structure(s) (e.g., 112 in FIG. 3; 112 and/or 116 in FIGS. 7 and 8) in a common rotational direction. In some embodiments, the rotating structure (e.g., 116 in FIG. 3; 126 in FIGS. 7 and 8) coupled to the propulsor rotor 60 may rotate with one or more of the core rotating structure(s) (e.g., 112 in FIG. 3; 112 and/or 116 in FIGS. 7 and 8) in opposite rotational directions. In some embodiments, the core rotating structures 112 and 116 may rotate in a common rotational direction. In some embodiments, the core rotating structures 112 and 116 may rotate in opposite rotational directions. Various exemplary rotational schemes for the rotating components (e.g., 60, 104, 105, 106, 107 and/or 128) of the aircraft propulsion systems 24A and 24B are outlined in Table 1 below.

TABLE 1

| Propulsion System Pairing | Propulsion System | Propulsor rotor ($OR_i$) | LPC rotor ($LPC_i$) | HPC rotor ($HPC_i$) | HPT rotor ($HPT_i$) | LPT rotor ($LPT_i$) | PT rotor (PTi) (optional) |
|---|---|---|---|---|---|---|---|
| 1 | 24A | +1 | +1 | −1 | −1 | +1 | — |
| | 24B | −1 | +1 | −1 | −1 | +1 | — |
| 2 | 24A | +1 | +1 | −1 | −1 | +1 | — |
| | 24B | −1 | +1 | −1 | −1 | −1 | — |
| 3 | 24A | +1 | +1 | −1 | −1 | +1 | — |
| | 24B | −1 | −1 | −1 | −1 | +1 | — |
| 4 | 24A | +1 | +1 | −1 | −1 | +1 | — |
| | 24B | −1 | −1 | +1 | +1 | −1 | — |
| 5 | 24A | +1 | +1 | −1 | −1 | +1 | −1 |
| | 24B | −1 | +1 | −1 | −1 | +1 | −1 |
| 6 | 24A | +1 | +1 | −1 | −1 | +1 | +1 |
| | 24B | −1 | +1 | −1 | −1 | +1 | −1 |

In this table 1, each rotating component (e.g., 60, 104, 105, 106, 107 and/or 128) is assigned a rotational parameter that is equal to

- positive one (+1) where the respective rotating component rotates in the first rotational direction; and
- negative one (−1) where the respective rotating component rotates in the second rotational direction.

Here, the direction of rotation may be viewed relative to a common reference direction. For example, the direction of rotation may be viewed from a forward facing aft direction along the respective propulsion system axis 46.

The following formulas may each characterize at least one, some or all of the foregoing rotational schemes in at least the Table 1 above.

$$OR_1 + OR_2 + LPC_1 + LPC_2 + HPC_1 + HPC_2 = 0 \quad \text{Equation 1}$$

$$OR_1 + OR_2 + HPT_1 + HPT_2 + LPT_1 + LPT_2 = 0 \quad \text{Equation 2}$$

$$OR_1 + OR_2 + HPT_1 + HPT_2 + LPT_1 + LPT_2 + PT_1 + PT_2 = 0 \quad \text{Equation 3}$$

$$|OR_1 + OR_2 + HPT_1 + HPT_2 + LPT_1 + LPT_2 + PT_1 + PT_2| \le 2 \quad \text{Equation 4}$$

$$(OR_1 * LPC_1 * HPC_1) + (OR_2 * LPC_2 * HPC_2) = 0 \quad \text{Equation 5}$$

$$(OR_1 * HPT_1 * LPT_1) + (OR_2 * HPT_2 * LPT_2) = 0 \quad \text{Equation 6}$$

$$(OR_1 * LPC_1 * HPC_1 * HPT_1 * LPT_1) + (OR_2 * LPC_2 * HPC_2 * HPT_2 * LPT_2) = 0 \quad \text{Equation 7}$$

$$(OR_1 * HPT_1 * LPT_1 * PT_1) + (OR_2 * HPT_2 * LPT_2 * PT_1) = 0 \quad \text{Equation 8}$$

$$(OR_1 * LPC_1 * HPC_1 * HPT_1 * LPT_1 * PT_1) + (OR_2 * LPC_2 * HPC_2 * HPT_2 * LPT_2 * PT_1) = 0 \quad \text{Equation 9}$$

The term "$OR_i$" is the rotational parameter for the propulsor rotor 60. The term "$LPC_i$" is the rotational parameter for the LPC rotor 104. The term "$HPC_i$" is the rotational parameter for the HPC rotor 105. The term "$HPT_i$" is the rotational parameter for the HPT rotor 106. The term "$LPT_i$" is the rotational parameter for the LPT rotor 107. The term "$PT_i$" is the rotational parameter for the PT rotor 128. The term "i" is equal to one (1) where the rotating component (e.g., 60, 104, 105, 106, 107 and/or 128) is part of the first aircraft propulsion system 24A. The term "i" is equal to two (2) where the rotating component (e.g., 60, 104, 105, 106, 107 and/or 128) is part of the second aircraft propulsion system 24B. By way of example, the Equation 1 for the propulsion system pairing (1) in the Table 1 above is as follows:

$$1 + -1 + 1 + 1 + -1 + -1 = 0.$$

In another example, the Equation 9 for the propulsion system pairing (5) in the Table 1 above is as follows:

$$(1 * 1 * -1 * -1 * 1 * -1) + (-1 * 1 * -1 * -1 * 1 * -1) = 0.$$

The following formulas may also or alternatively characterize at least one, some or all of the foregoing rotational schemes in at least the Table 1 above.

$$|\gamma_c/\alpha_c| \le 0.2 \quad \text{Equation 10}$$

$$|\gamma_c/\beta_c| \le 0.2 \quad \text{Equation 11}$$

$$|\gamma_t/\alpha_t| \le 02 \quad \text{Equation 12}$$

$$|\gamma_t/\beta_t| \le 0.2 \quad \text{Equation 13}$$

The terms "$\gamma_c$", "$\alpha_c$", "$\beta_c$", "$\gamma_t$", "$\alpha_t$" and "$\beta_t$" may be determined as follows:

$$\text{Compressor gamma parameter } (\gamma_c) = \alpha_c + \beta_c$$

$$\text{Turbine gamma parameter } (\gamma_t) = \alpha_t + \beta_t$$

$$\text{Compressor alpha parameter } (\alpha_c) = \alpha_{OR1} + \alpha_{LPC1} + \alpha_{HPC1}$$

$$\text{Compressor beta area parameter } (\beta_c) = \beta_{OR2} + \beta_{LPC2} + \beta_{HPC2}$$

$$\text{Turbine alpha parameter } (\alpha_t) = \alpha_{OR1} + \alpha_{HPT1} + \alpha_{LPT1}$$

$$\text{Turbine beta area parameter } (\beta_c) = \beta_{OR2} + \beta_{HPT2} + \beta_{LPT2}$$

$$\alpha_{OR1} = OR_1 * A_{OR1}$$

$$\alpha_{LPC1} = LPC_1 * A_{LPC1}$$

$$\alpha_{HPC1} = HPC_1 * A_{HPC1}$$

$$\alpha_{HPT1} = HPT_1 * A_{HPT1}$$

$$\alpha_{LPT1} = LPT_1 * A_{LPT1}$$

$$\beta_{OR2} = OR_2 * A_{OR2}$$

$$\beta_{LPC2} = LPC_2 * A_{LPC2}$$

$$\beta_{HPC2} = HPC_2 * A_{HPC2}$$

-continued $$\beta_{HPT2} = HPT_2 * A_{HPT2}$$

$$\beta_{LPT2} = LPT_2 * A_{LPT2}$$

Figure 9:
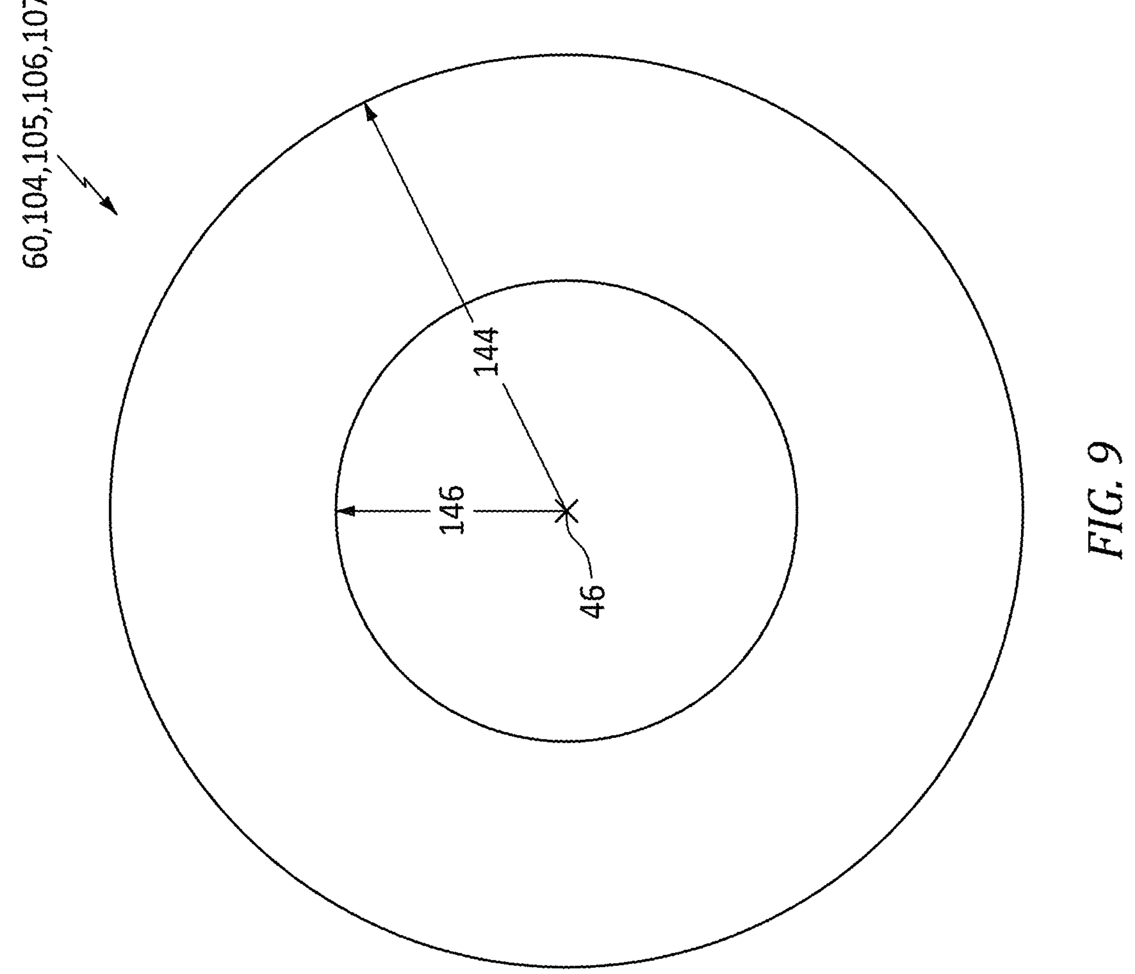
FIG. 9 is a schematic illustration of a rotor for the propulsion system.

The term "$A_{ORi}$" is a flow area for the propulsor rotor 60. The term "$A_{LPCi}$" is a flow area for the LPC rotor 104. The term "$A_{HPCi}$" is a flow area for the HPC rotor 105. The term "$A_{HPTi}$" is a flow area for the HPT rotor 106. The term "$A_{LPTi}$" is a flow area for the LPT rotor 107. As described above, the term "i" is equal to one (1) where the rotating component (e.g., 60, 104, 105, 106, 107) is part of the first aircraft propulsion system 24A. The term "i" is equal to two (2) where the rotating component (e.g., 60, 104, 105, 106, 107) is part of the second aircraft propulsion system 24B. Referring to FIG. 3, the flow area of a respective rotor (e.g., 60, 104, 105, 106, 107) may be measured at a point of highest pressure; e.g., an axial downstream end 134 of the propulsor rotor 60, an axial downstream end 136 of the LPC rotor 104, an axial downstream end 138 of the HPC rotor 105, an axial upstream end 140 of the HPT rotor 106, and an axial upstream end 142 of the LPT rotor 107. Referring to FIG. 9, the flow area of a respective rotor (e.g., 60, 104, 105, 106, 107) may be measured as follows:

$$\text{Rotor Flow Area } (A) = \pi * \left((R_O)^2 - (R_I)^2\right)$$

The term "$R_O$" is an outer radius 144 of a bladed region of the respective rotor (e.g., 60, 104, 105, 106, 107); e.g., at a tip of a respective blade. The term "$R_I$" is an inner radius 146 of the bladed region of the respective rotor (e.g., 60, 104, 105, 106, 107); e.g., at a base of the respective blade.

While the equations 10-13 are described above as being equal to or less than 0.2, the present disclosure is not limited to such exemplary values. In other embodiments, for example, any one or more or each of the equations 10-13 may be equal to or less than 0.1. In still other embodiments, any one or more or each of the equations 10-13 may be equal to or less than 0.05.

The rotational schemes characterized by the foregoing formulas are particularly useful in providing the (e.g., companion) aircraft propulsion systems 24A and 24B with the symmetric rotating pattern of FIG. 5A or 5B, while reducing propulsion system complexity, reducing research and development efforts, reducing spare part holding requirements, reducing maintenance and/or inspection knowledge requirements, etc. The propulsion system pairing (4) in the Table 1 above may also reduce propulsion system certification testing requirements since the second aircraft propulsion system 24B may be a (e.g., exact) mirror image of the first aircraft propulsion system 24A. Therefore, although like rotating components of the aircraft propulsion systems 24 rotate in opposite directions, it is contemplated the aircraft propulsion systems 24 will operate with common operational parameters, limits, etc.

In some embodiments, a select rotational scheme which provides the (e.g., companion) aircraft propulsion systems 24A and 24B with the symmetric rotating pattern of FIG. 5A or 5B may satisfy any single one of the foregoing equations 1-13. In other embodiments, a select rotational scheme which provides the (e.g., companion) aircraft propulsion systems 24A and 24B with the symmetric rotating pattern of FIG. 5A or 5B may satisfy two or more of the foregoing equations 1-13. For example, any one of the equations 10-13 may be paired with one or more of the equations 1-9. In another example, any two or more or all of the equations 10-13 may be paired with one another. In still another example, any one or more of the equations 1-4 may be paired with any one or more of the equations 5-8. The present disclosure, of course, is not limited to the foregoing exemplary equation pairing.

In some embodiments, the propulsor rotor 60 may include at least (or only) nine (9) of the propulsor blades 68 in its array. In other embodiments, the propulsor rotor 60 may include twelve (12) or more of the propulsor blades 68 in its array.

The aircraft propulsion system 24 of FIGS. 3, 7 and 8 and its propulsion section 54 are described above with a tractor configuration; e.g., where the propulsor rotor 60 is disposed at or otherwise near the propulsion system forward end 48. It is contemplated, however, the propulsion section 54 may alternatively be disposed at or otherwise near the propulsion system aft end 50 to provide a pusher fan configuration.

The guide vane structure 62 is described above as a fixed (e.g., non-rotatable) guide vane structure. It is contemplated, however, the guide vane structure 62 may alternatively be selectively rotatable about the propulsion system axis 46. With such an arrangement, the respective aircraft propulsion system 24 may be configured as an open rotor propulsion system with a swirl recovery blade (SRB) open rotor architecture. More particularly, the respective aircraft propulsion system 24 may operate as: (A) a counter-rotating open rotor (CROR) propulsion system during a dual rotor mode of operation (e.g., when both the propulsor rotor 60 and the structure 62 are counter-rotating about the propulsion system axis 46); and (B) a single open rotor and swirl recovery vane (SRV) propulsion system during a single rotor mode of operation (e.g., when the propulsor rotor 60 is rotating and the structure 62 is rotationally fixed about the propulsion system axis 46). Note, when the guide vane structure 62 is configured to selectively rotate about the propulsion system axis 46, the moving guide vanes 76 operate as propulsor blades.

The aircraft propulsion system 24 of FIGS. 3, 7 and 8 and its propulsion section 54 are described as including the guide vane structure 62 with an SRV or SRB configuration. The present disclosure, however, is not limited to such an exemplary propulsion system configuration. For example, each aircraft propulsion system 24 may alternatively be configured without an open guide vane structure. Each aircraft propulsion system 24 may thereby be configured as a single rotor (SR) open rotor propulsion system. In another example, each aircraft propulsion system 24 may alternatively be configured with a set of the open propulsor rotors (e.g., counter-rotating propulsor rotors) operatively coupled to the turbine engine 56 (see FIGS. 3, 7 and 8) through the geartrain 58. Each aircraft propulsion system 24 may thereby be configured as a counter-rotating open rotor (CROR) propulsion system.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:

a first propulsion system and a second propulsion system;

each of the first propulsion system and the second propulsion system including an open propulsor rotor and a turbine engine configured to drive rotation of the open propulsor rotor, the open propulsor rotor comprising a plurality of open propulsor blades, the turbine engine including a compressor section, a combustor section, a turbine section, a first rotating structure, a second rotating structure and a flowpath, the first rotating structure comprising a first bladed rotor, the second rotating structure comprising a second bladed rotor and operable to rotate independent of the first rotating structure, and the flowpath extending through the compressor section, the combustor section and the turbine section with the first bladed rotor disposed between the second bladed rotor and the combustor section along the flowpath;

wherein the open propulsor rotor of the first propulsion system is configured to rotate a first rotational direction and has a first propulsor rotation parameter equal to positive one;

wherein the open propulsor rotor of the second propulsion system is configured to rotate a second rotational direction, that is opposite the first rotational direction, and has a second propulsor rotation parameter equal to negative one;

wherein the first bladed rotor of the first propulsion system has a first system first rotor rotation parameter equal to positive one where the first bladed rotor of the first propulsion system is configured to rotate in the first rotational direction or negative one where the first bladed rotor of the first propulsion system is configured to rotate in the second rotational direction;

wherein the first bladed rotor of the second propulsion system has a second system first rotor rotation parameter equal to positive one where the first bladed rotor of the second propulsion system is configured to rotate in the first rotational direction or negative one where the first bladed rotor of the second propulsion system is configured to rotate in the second rotational direction;

wherein the second bladed rotor of the first propulsion system has a first system second rotor rotation parameter equal to positive one where the second bladed rotor of the first propulsion system is configured to rotate in the first rotational direction or negative one where the second bladed rotor of the first propulsion system is configured to rotate in the second rotational direction;

wherein the second bladed rotor of the second propulsion system has a second system second rotor rotation parameter equal to positive one where the second bladed rotor of the second propulsion system is configured to rotate in the first rotational direction or negative one where the second bladed rotor of the second propulsion system is configured to rotate in the second rotational direction; and wherein a sum of the first propulsor rotation parameter, the second propulsor rotation parameter, the first system first rotor rotation parameter, the second system first rotor rotation parameter, the first system second rotor rotation parameter and the second system second rotor rotation parameter is equal to zero.

2. The assembly of claim 1, wherein the first bladed rotor of the first propulsion system and the first bladed rotor of the second propulsion system are configured to rotate in a common rotational direction.

3. The assembly of claim 1, wherein the first bladed rotor of the first propulsion system and the first bladed rotor of the second propulsion system are configured to rotate in opposite rotational directions.

4. The assembly of claim 1, wherein the second bladed rotor of the first propulsion system and the second bladed rotor of the second propulsion system are configured to rotate in a common rotational direction.

5. The assembly of claim 1, wherein the second bladed rotor of the first propulsion system and the second bladed rotor of the second propulsion system are configured to rotate in opposite rotational directions.

6. The assembly of claim 1, wherein the first bladed rotor of each of the first propulsion system and the second propulsion system comprises a first bladed compressor rotor; and the second bladed rotor of each of the first propulsion system and the second propulsion system comprises a second bladed compressor rotor.

7. The assembly of claim 1, wherein the first bladed rotor of each of the first propulsion system and the second propulsion system comprises a first bladed turbine rotor; and the second bladed rotor of each of the first propulsion system and the second propulsion system comprises a second bladed turbine rotor.

8. The assembly of claim 1, wherein the first bladed rotor of the first propulsion system is next to the second bladed rotor of the first propulsion system along the flowpath of the first propulsion system; and the first bladed rotor of the second propulsion system is next to the second bladed rotor of the second propulsion system along the flowpath of the second propulsion system.

9. The assembly of claim 1, wherein the second rotating structure of the first propulsion system is operatively coupled to and configured to drive the rotation of the open propulsor rotor of the first propulsion system; and the second rotating structure of the second propulsion system is operatively coupled to and configured to drive the rotation of the open propulsor rotor of the second propulsion system.

10. The assembly of claim 1, wherein the turbine engine of the first propulsion system further includes a first engine third rotating structure operatively coupled to the open propulsor rotor of the first propulsion system, the first engine third rotating structure comprises a first engine third structure bladed rotor disposed within the turbine section of the first propulsion system, the first engine third structure bladed rotor has a first system third rotor rotation parameter equal to positive one where the first engine third structure bladed rotor is configured to rotate in the first rotational direction or negative one where the first engine third structure bladed rotor is configured to rotate in the second rotational direction;

the turbine engine of the second propulsion system further includes a second engine third rotating structure operatively coupled to the open propulsor rotor of the second propulsion system, the second engine third rotating structure comprises a second engine third structure bladed rotor disposed within the turbine section of the second propulsion system, the second engine third structure bladed rotor has a second system third rotor rotation parameter equal to positive one where the second engine third structure bladed rotor is configured to rotate in the first rotational direction or negative one where the second engine third structure bladed rotor is configured to rotate in the second rotational direction; and an absolute value of a sum of the first propulsor rotation parameter, the second propulsor rotation parameter, the first system first rotor rotation parameter, the second system first rotor rotation parameter, the first system second rotor rotation parameter, the second system second rotor rotation parameter, the first system third rotor rotation parameter and the second system third rotor rotation parameter is equal to or less than two.

11. The assembly of claim 10, wherein the sum of the first propulsor rotation parameter, the second propulsor rotation parameter, the first system first rotor rotation parameter, the second system first rotor rotation parameter, the first system second rotor rotation parameter, the second system second rotor rotation parameter, the first system third rotor rotation parameter and the second system third rotor rotation parameter is equal to zero.

12. The assembly of claim 1, wherein the turbine engine of each of the first propulsion system and the second propulsion system is configured as a two-spool engine.

13. The assembly of claim 1, wherein the turbine engine of each of the first propulsion system and the second propulsion system is configured as a three-spool engine.

14. The assembly of claim 1, wherein each of the first propulsion system and the second propulsion system further includes an open guide vane structure next to the open propulsor rotor.

15. The assembly of claim 1, wherein each of the first propulsion system and the second propulsion system further includes a geared drivetrain operatively coupling the open propulsor rotor to the turbine engine.

16. The assembly of claim 1, further comprising:

an aircraft airframe comprising an aircraft fuselage;

the first propulsion system and the second propulsion system mounted to the aircraft airframe and arranged to opposing lateral sides of the aircraft fuselage.

17. The assembly of claim 1, wherein the open propulsor rotor of each of the first propulsion system and the second propulsion system comprises at least twelve of the open propulsor blades.

18. An assembly for an aircraft, comprising:

a first propulsion system and a second propulsion system;

each of the first propulsion system and the second propulsion system including an open propulsor rotor and a turbine engine configured to drive rotation of the open propulsor rotor, the open propulsor rotor comprising a plurality of open propulsor blades, the turbine engine including a compressor section, a combustor section, a turbine section, a first rotating structure, a second rotating structure and a flowpath, the first rotating structure comprising a first bladed rotor, the second rotating structure comprising a second bladed rotor and operable to rotate independent of the first rotating structure, and the flowpath extending through the compressor section, the combustor section and the turbine section with the first bladed rotor disposed between the second bladed rotor and the combustor section along the flowpath;

wherein the open propulsor rotor of the first propulsion system is configured to rotate a first rotational direction and has a first propulsor rotation parameter equal to positive one;

wherein the open propulsor rotor of the second propulsion system is configured to rotate a second rotational direction, that is opposite the first rotational direction, and has a second propulsor rotation parameter equal to negative one;

wherein the first bladed rotor of the first propulsion system has a first system first rotor rotation parameter equal to positive one where the first bladed rotor of the first propulsion system is configured to rotate in the first rotational direction or negative one where the first bladed rotor of the first propulsion system is configured to rotate in the second rotational direction;

wherein the first bladed rotor of the second propulsion system has a second system first rotor rotation parameter equal to positive one where the first bladed rotor of the second propulsion system is configured to rotate in the first rotational direction or negative one where the first bladed rotor of the second propulsion system is configured to rotate in the second rotational direction;

wherein the second bladed rotor of the first propulsion system has a first system second rotor rotation parameter equal to positive one where the second bladed rotor of the first propulsion system is configured to rotate in the first rotational direction or negative one where the second bladed rotor of the first propulsion system is configured to rotate in the second rotational direction;

wherein the second bladed rotor of the second propulsion system has a second system second rotor rotation parameter equal to positive one where the second bladed rotor of the second propulsion system is configured to rotate in the first rotational direction or negative one where the second bladed rotor of the second propulsion system is configured to rotate in the second rotational direction;

wherein a product of the first propulsor rotation parameter, the first system first rotor rotation parameter and the first system second rotor rotation parameter is equal to a first value;

wherein a product of the second propulsor rotation parameter, the second system first rotor rotation parameter and the second system second rotor rotation parameter is equal to a second value; and wherein a sum of the first value and the second value is equal to zero.

19. The assembly of claim 18, wherein the turbine engine of the first propulsion system further includes a first engine third rotating structure operatively coupled to the open propulsor rotor of the first propulsion system, the first engine third rotating structure comprises a first engine third structure bladed rotor disposed within the turbine section of the first propulsion system, the first engine third structure bladed rotor has a first system third rotor rotation parameter equal to positive one where the first engine third structure bladed rotor is configured to rotate in the first rotational direction or negative one where the first engine third structure bladed rotor is configured to rotate in the second rotational direction;

the turbine engine of the second propulsion system further includes a second engine third rotating structure operatively coupled to the open propulsor rotor of the second propulsion system, the second engine third rotating structure comprises a second engine third structure bladed rotor disposed within the turbine section of the second propulsion system, the second engine third structure bladed rotor has a second system third rotor rotation parameter equal to positive one where the second engine third structure bladed rotor is configured to rotate in the first rotational direction or negative one where the second engine third structure bladed rotor is configured to rotate in the second rotational direction;

a product of the first propulsor rotation parameter, the first system first rotor rotation parameter, the first system second rotor rotation parameter and the first system third rotor rotation parameter is equal to a third value;

a product of the second propulsor rotation parameter, the second system first rotor rotation parameter, the second system second rotor rotation parameter and the second system third rotor rotation parameter is equal to a fourth value; and a sum of the third value and the fourth value is equal to zero.

20. An assembly for an aircraft, comprising:

a first propulsion system and a second propulsion system;

each of the first propulsion system and the second propulsion system including an open propulsor rotor and a turbine engine configured to drive rotation of the open propulsor rotor, the turbine engine including a compressor section, a combustor section, a turbine section, a first rotating structure, a second rotating structure and a flowpath, the first rotating structure comprising a first bladed rotor, the second rotating structure comprising a second bladed rotor and operable to rotate independent of the first rotating structure, and the flowpath extending through the compressor section, the combustor section and the turbine section with the first bladed rotor disposed between the second bladed rotor and the combustor section along the flowpath;

wherein the open propulsor rotor of the first propulsion system is configured to rotate a first rotational direction and has a first propulsor rotation parameter equal to positive one;

wherein the open propulsor rotor of the second propulsion system is configured to rotate a second rotational direction, that is opposite the first rotational direction, and has a second propulsor rotation parameter equal to negative one;

wherein the first bladed rotor of the first propulsion system has a first system first rotor rotation parameter equal to positive one where the first bladed rotor of the first propulsion system is configured to rotate in the first rotational direction or negative one where the first bladed rotor of the first propulsion system is configured to rotate in the second rotational direction;

wherein the first bladed rotor of the second propulsion system has a second system first rotor rotation parameter equal to positive one where the first bladed rotor of the second propulsion system is configured to rotate in the first rotational direction or negative one where the first bladed rotor of the second propulsion system is configured to rotate in the second rotational direction;

wherein the second bladed rotor of the first propulsion system has a first system second rotor rotation parameter equal to positive one where the second bladed rotor of the first propulsion system is configured to rotate in the first rotational direction or negative one where the second bladed rotor of the first propulsion system is configured to rotate in the second rotational direction;

wherein the second bladed rotor of the second propulsion system has a second system second rotation parameter equal to positive one where the second bladed rotor of the second propulsion system is configured to rotate in the first rotational direction or negative one where the second bladed rotor of the second propulsion system is configured to rotate in the second rotational direction;

wherein an absolute value of a sum of the first propulsor rotation parameter, the second propulsor rotation parameter, the first system first rotor rotation parameter, the second system first rotor rotation parameter, the first system second rotor rotation parameter and the second system second rotor rotation parameter is equal to or less than two;

wherein a product of the first propulsor rotation parameter, the first system first rotor rotation parameter and the first system second rotor rotation parameter is equal to a first value;

wherein a product of the second propulsor rotation parameter, the second system first rotor rotation parameter and the second system second rotor rotation parameter is equal to a second value; and wherein a sum of the first value and the second value is equal to zero.

* * * * *